March 20, 1956 T. G. DELANG 2,739,135
SKID-RESISTANT COMPOSITION COMPRISING CORN KERNELS.
Filed July 9, 1952
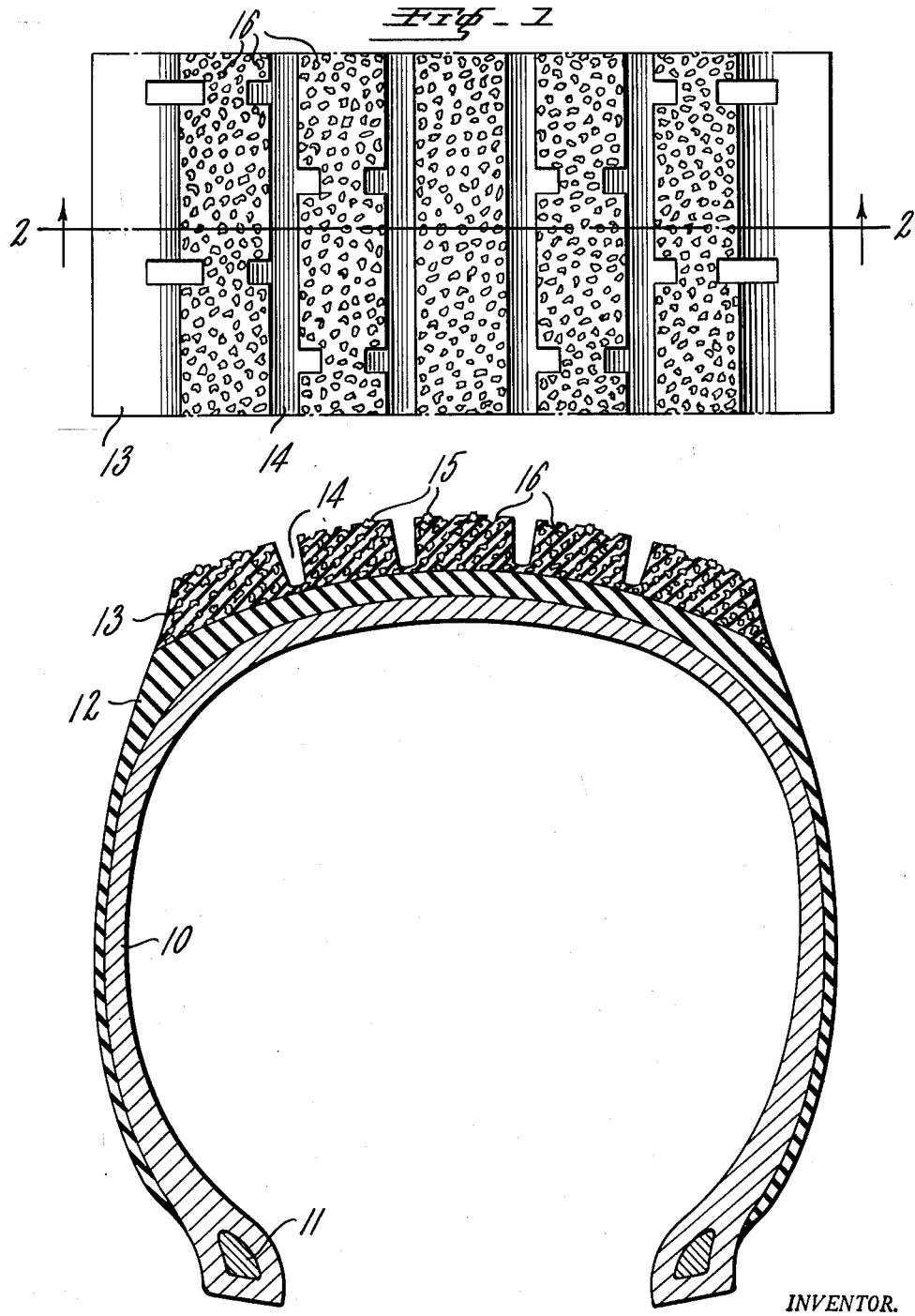
INVENTOR.
THEODORE G. DELANG
BY
Irwin M. Lewis
ATTORNEY United States Patent Office 2,739,135
Patented Mar. 20, 1956

2,739,135

SKID-RESISTANT COMPOSITION COMPRISING CORN KERNELS

Theodore G. Delang, Indianapolis, Ind., assignor to United States Rubber Company, New York, N. Y., a corporation of New Jersey Application July 9, 1952, Serial No. 297,851

2 Claims. (Cl. 260—17.4)

This invention relates to a skid-resistant composition for use in tire treads, shoe soles, shoe heels, and other articles in which anti-skid characteristics are desired.

More particularly, the invention relates to tread stock for tires in which is imbedded small particles which will be self-evacuating as they are exposed by wear of the tread and leave cavities or pits in the tread which give desired anti-skid characteristics.

Many different materials have been used for this purpose. One of the most successful materials heretofore used has been salt crystals which dissolve in the presence of moisture to leave the pits or cavities. Salt crystals, however, have the disadvantage that they present a corrosion problem to the exposed metal parts of the vehicle on which the tire is used. In addition, salt crystals are quite heavy and must be specially coated in order to properly mix them with the elastomeric material from which the tread is formed. Other materials such as hulls, pulp, skin, cotton, hair, ground corn cobs, cork, and sawdust have been suggested for use in tire treads, but such materials have configurations or textures which promote mechanical anchorage or which exhibit an adhesiveness to the cured tire tread and do not, therefore, evacuate very readily from the tread of the tire.

The present invention contemplates the use of particulated corn kernels in the elastomeric material. Particulated corn kernels have been found to have a remarkable combination of properties which make them ideally suited for this purpose. One such property is that they readily evacuate from the tread of the tire when they are exposed by wear of the tread and leave a multitude of small cavities or pits which give ideal traction to the tire on surfaces that are wet or coated with ice or snow. In addition, they are irregular in shape and provide sharp corners and edges which give additional traction to the tread prior to their evacuation from the surface of the tread.

No special equipment is necessary to compound particulated corn kernels with elastomeric materials and they may be readily mixed in an open mill, Banbury mixer, or any other conventional mixing equipment. While particulated corn kernels have been found to exhibit practically no adhesiveness to cured elastomeric material and therefore evacuate very readily when exposed to the surface of such material, they do exhibit an adhesiveness to uncured elastomeric material. Because of this remarkable property, they remain in the uncured elastomeric material during the mixing and processing and do not have the tendency to fall out as is characteristic of such materials as sand, salt, stone, metals, etc. which have heretofore been used. Furthermore they do not need any special treatment such as a coating to combine them with the elastomeric material.

Particulated corn kernels have been found to have sufficient hardness, strength and density that they do not break up or compact during processing or vulcanization such as would be the case in the use of cork, sawdust, leather, wood, cottons, pulp, etc. Particulated corn kernels also have the advantage over such materials as sand, abrasives, stone and metals in that they do not cause undesirable wear and damage to the processing equipment. Particulated corn kernels are comparatively light in weight, inexpensive and readily available.

Other objects and advantages of the present invention will become apparent from the following description when read in conjunction with the following drawings wherein Fig. 1 is a partial plan view of a pneumatic tire having a tread porton formed of the skid-resistant composition of the invention, and Fig. 2 is a sectional view taken on the line 2—2 of Fig. 1.

The skid-resistant composition of the present invention comprises an elastomeric material having particulated corn kernels disbursed substantially uniformly therethrough. The elastomeric material may be a rubbery conjugated diene polymer such as natural rubber, rubbery butadiene-styrene copolymer or blends thereof, containing fillers, softeners, vulcanizing agents, accelerators and other materials to impart desired properties.

The corn kernels are particulated by grinding or crushing in conventional grinders or crushers. Corn kernels so particulated are irregular in shape and have sharp corners and edges. Preferably, the harder part or endosperm of the kernel is used in the composition of the invention. This portion of the corn kernel from which the shell and germ has been removed is marketed commercially and is commonly known as corn grits.

The particle size which has been found to give the best results and which, therefore, preferred, is that which will pass through U. S. Standard Sieve Series No. 12 screen and will be retained on a U. S. Standard Sieve Series No. 20 screen.

The particulated corn kernels may be mixed with the elastomeric material in an open mill, Banbury mixer or any other conventional mixing equipment. For convenience in control testing, the other compounding ingredients such as fillers, vulcanizing agents, accelerators, etc. are fixed mixed with the elastomeric material and the stock control tested for cure in the conventional manner before the particulated corn kernels are added.

A sufficient amount of the particulated corn kernels are mixed with the elastomeric material so that the particulated corn kernels provide from 10 to 30% of the volume of the composition. A composition consisting of approximately 20% by volume of particulated corn kernels is preferred.

After compounding, the composition may be extruded from a conventional tread tuber to form strips of tread stock for tires. The tread stock so formed may be applied in new tire construction or may be used for retreading or recapping old tires. The tread stock is applied and cured in the conventional manner.

A typical example of a tread composition embodying the present invention and using a synthetic rubber as the elastomeric material is as follows:

| Material: | Parts by weight |
|---|---|
| Rubbery butadiene-styrene copolymer | 100 |
| Carbon black | 40 |
| Zinc oxide | 5 |
| Stearic acid | 2 |
| Softener | 10 |
| Antioxidant | 1 |
| Accelerator | 1 |
| Sulphur | 2 |
| Corn grits | 50 |

Referring to Figs. 1 and 2 of the drawing there is shown a pneumatic tire embodying the skid-resistant composition of the present invention. The tire includes a carcass 10, bead elements 11, sub-tread portion 12, and tread portion 13, as in conventional tire construction. The surface of the tread portion 13 may be provided with anti-skid grooves 14 or may be left plain. The tread portion 13 is formed of a strip or layer of the skid-resistant composition as previously described.

Referring to Fig. 2, it can be seen that the particulated corn kernels 15 are uniformly disbursed through the full depth of the tread portion 13. As the tread 13 wears down by the friction thereof with the road, new particles of the particulated corn kernels 15 are constantly exposed at the surface of the tread. These particles 15 quickly evacuate the tread under the constant flexing of the tread of the tire in use and friction thereof with the road and leave a multitude of small cavities or pits as indicated by the reference number 16. Why the particulated corn kernels 15 evacuate the tread so quickly is not clearly understood. Apparently the bond between the particulated corn kernels 15 and the cured elastomeric material, because of the nature of these materials, is ideal for the occurrence of this phenomenon. The walls of the cavities or pits 16, left when the particulated corn kernels 13 evacuate the tread, provide cutting edges which bite into any snow or mud which might be on the road surface and which give a wiping action to remove the water film in the case of wet roads to thereby improve the traction of the tire with the road.

The newly exposed particles 15, before they have a chance to evacuate from the tread, present sharp edges and corners which give a good coefficient friction between the tread and the surface of the road prior to their evacuation. The particles 15, however, evacuate so rapidly that they do not have sufficient time to wear smooth as is the case of other materials used in this manner. The surface of the tread portion 13, therefore, always has either a plurality of pits or cavities 16 therein or sharp edged particles 13 extending therefrom or a combination of both which give excellent anti-skid characteristics to the tread of the tire at all times. The period of time, however, between exposure of the particles 15 and their evacuation from the tread surface is practically negligible and the anti-skid characteristics are provided almost entirely by the more desirable pits and cavities 16.

From the above description, it can be seen that there is provided a new skid-resistant composition which is ideally suited for use as the tread portion of a pneumatic tire or for use in other articles such as shoe soles, heels and the like in which anti-skid properties are desired because it may be easily compounded by use of conventional processing equipment and because it gives ideal anti-skid characteristics.

While certain preferred embodiments of the invention have been shown and described, it will be understood that modifications may be made therein without departing from the spirit of the invention or the scope of the appended claims.

Having thus described my invention, what I claim and desire to protect by Letters Patent is:

1. A skid-resistant composition comprising a rubbery conjugated diene polymer having particulated corn kernels dispersed substantially uniformly therethrough, said particulated corn kernels being of a particle size that will pass through a U. S. Standard Sieve Series No. 12 screen but will be retained on a U. S. Standard Sieve Series No. 20 screen, said particulated corn kernels comprising from 10 to 30% of the volume of the composition.

2. A skid-resistant composition comprising, a rubbery conjugated diene polymer having corn grits dispersed substantially uniformly therethrough, said corn grits being of a particle size that will pass through a U. S. Standard Sieve Series No. 12 screen but will be retained on a U. S. Standard Sieve Series No. 20 screen, said corn grits comprising from 10 to 30% of the volume of the composition.

References Cited in the file of this patent

UNITED STATES PATENTS

| | | |
|---|---|---|
| Re. 23,135 | Gapen | July 19, 1949 |
| 229,817 | Gerner | July 13, 1880 |
| 2,585,219 | Boyle | Feb. 12, 1952 |
| 2,607,386 | Pavlik | Aug. 13, 1952 |